April 12, 1960 N. N. P. SMITH ET AL 2,932,793

AUTOMATIC FREQUENCY CONTROLLING SYSTEMS

Filed Sept. 17, 1957

INVENTORS:
Norman Neville Parker Smith and John Henry Howe
By: Baldwin & Wight, ATTORNEYS United States Patent Office 2,932,793

Patented Apr. 12, 1960

2,932,793

AUTOMATIC FREQUENCY CONTROLLING SYSTEMS

Norman Neville Parker Smith, Chelmsford, and John Henry Howe, Hockley, England, assignors to Marconi's Wireless Telegraph Company Limited, London, England, a company of Great Britain Application September 17, 1957, Serial No. 684,566

Claims priority, application Great Britain November 20, 1956

3 Claims. (Cl. 328—134)

Figure 1:
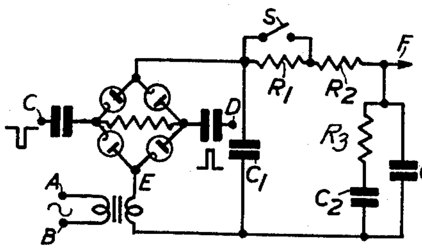

This invention relates to automatic frequency control systems and more specifically to automatic frequency control circuit arrangements of the kind adapted to produce a control signal for controlling an oscillator in dependence upon the degree of lack of synchronism between oscillations generated thereby and reference frequency oscillations. Control circuit arrangements of the kind referred to are frequently required to have a rapid "pull in" time over a wide frequency range and a slow "rate of follow" once near-synchronism (i.e. synchronism near enough to lock the oscillator to the reference frequency) has been establishd. A common example in which this requirement arises is that of a television synchronizing pulse generator, and it is common in such cases to provide the control circuit arrangement with a switch adapted to change the values of the resistance-capacity time constant circuit elements in the control circuit so that in one position of the switch a fast control action is obtained and in the other (when near-synchronism is establishd) a slow control action is obtained. Sometimes the switch is manually operated but sometimes it is a relay switch whose operating current is derived from a circuit adapted to detect the beat note which occurs when the oscillator is not "locked" to the reference frequency.

The invention seeks to provide improved circuit arrangements of the kind referred to which shall provide the two different rates of control action required purely automatically without the use of a switch or relay and which shall, at the same time, be simple, economical and easy to set up.

According to this invention a control circuit arrangement adapted to produce a control signal for controlling a source of oscillations in dependence upon the degree of lack of synchronism between the oscillations produced by said source and oscillations of reference frequency comprises means actuated at the source oscillation frequency for gating the reference oscillations to produce periodic pulse signals of magnitude dependent upon the instantaneous amplitudes of the reference oscillations at the moments of gating, and means for applying said periodic pulse signals to a circuit including a storage condenser in series with a resistance shunted by a pair of oppositely poled unilaterally conductive devices, said devices being so biased as to be non-conductive when the applied periodic pulse signals correspond to near-synchronism between the source frequency and the reference frequency.

In a preferred circuit arrangement pulses of opposite polarity and of source frequency are applied to opposite ends of one diagonal of a rectifier bridge the other diagonal of which is in series with a supply of reference frequency, and the series circuit including said other diagonal and the reference frequency supply is connected across a second series circuit comprising a condenser in series with a resistance shunted by two oppositely poled biased rectifiers, said second series circuit being in turn in parallel with a resistance-capacity network.

Figure 2:
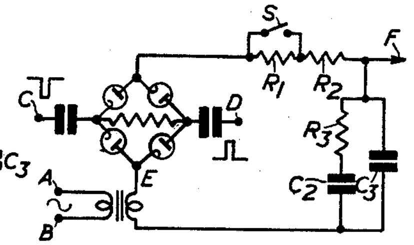
Figures 3, 4:
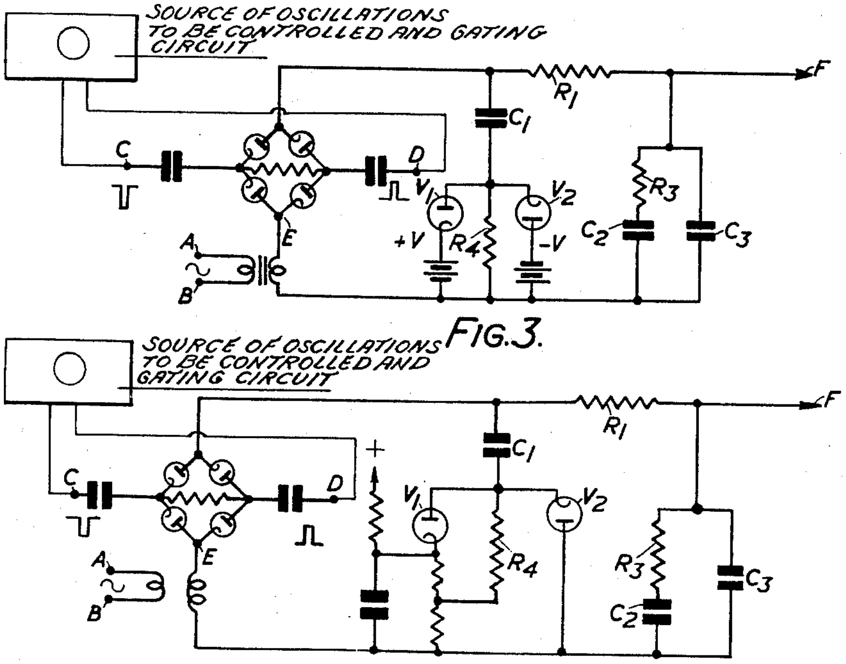

The invention is illustrated in and further explained in connection with the accompanying drawings in which Figs. 1 and 2 are explanatory diagrams showing known arrangements of the switch or relay type, these figures being provided for purposes of explanation, and Figs. 3 and 4 are circuit diagrams of two embodiments of the present invention. Like references are used for like parts throughout the figures.

Referring to the drawings, the invention will be particularly described with reference to one of its most important applications, namely to a television synchronizing generator. In common television practice, in order to establish the number of scanning lines per television field, the output from an oscillator running at twice the line repetition frequency is divided by a frequency divider, such as a conventional counting chain, the output from which is employed to determine the field scanning repetition rate. It is common practice to synchronize this field frequency with that of a mains alternating current supply by means of a discriminator or control circuit arrangement which compares the generated field frequency with the reference frequency and produces a control voltage which is then employed to control the oscillator of twice the line frequency. Figs. 1 and 2 show two typical known discriminators or control circuit arrangements which are switch-controllable to provide either of two time constants, one giving slow action and being appropriate to near-synchronism conditions (i.e. when the oscillator is "locked") and the other giving fast action and being appropriate to "pull in" conditions.

Referring to Fig. 1 a reference frequency mains supply is applied at terminals A, B to one end E of one diagonal of a rectifier bridge shown as consisting of four diodes. In Fig. 1 the reference frequency is injected by means of a transformer, the secondary of which is in series with one bridge diagonal. Coincident field frequency gating pulses obtained in any convenient way from the oscillation source (not shown) to be controlled and of opposite polarities are applied at C and D to opposite ends of the other diagonal of the bridge to gate the said bridge. A condenser $C_1$ is connected across the series circuit consisting of the transformer secondary and the bridge and output is taken at F through resistances $R_1$, $R_2$, one of which is shunted by a switch S. The terminal F is connected to the other side of condenser $C_1$ through a two-branch circuit, one of which consists of a resistance $R_3$ in series with a condenser $C_2$ and the other of which consists of the condenser $C_3$.

The action of this arrangement is well known. The condenser $C_1$ is charged to the potential existing at the point E of the bridge at the instant when said bridge is rendered conducting by the gating pulses applied at C and D. The elements $R_1$, $R_2$, $R_3$, $C_2$ and $C_3$ constitute a low pass filter restricting the rate at which the output control voltage at F can follow the voltage fluctuations across condenser $C_1$. If the switch S is closed the resistance $R_1$ is effectively cut out of circuit and the time constant of the network accordingly reduced. Thus, by operating the switch S either of two modes of operation, fast or slow, is obtainable.

The known arrangement of Fig. 2 is similar to that of Fig. 1 except for the omission of the condenser $C_1$. Since this condenser $C_1$ is omitted the potential at point E is transferred directly to the condensers $C_2$ and $C_3$. Since, however, the bridge is conducting for only a small part of each cycle and the time constant of the low pass filter is long compared with the duration of the gating pulses, the apparent values of $R_1$ and $R_2$ are increased inversely with the ratio of the pulse width to the interval between pulses. Accordingly a very long effective time constant can be obtained without having to use very large components. As in Fig. 1 either of two modes, fast or slow, is obtainable by operating the switch S across resistance $R_1$.

Fig. 3 shows an embodiment of the present invention. The source of oscillations to be controlled and a portion of the gating circuit is indicated at O for delivering gating pulses of opposite polarities to terminals C and D leading to one pair of diagonal terminal connections of the bridge including the high resistance path leading to the said terminal connections. Another pair of diagonal terminal connections is provided for the other diagonal for the bridge, the last mentioned connections being arranged in series with the source of oscillations of reference frequency. As will be apparent the switch S and the resistance $R_2$ of Figs. 1 and 2 are dispensed with and the condenser $C_1$ is now in series with a resistance $R_4$ across which are two oppositely poled rectifiers $V_1$, $V_2$ suitably biased by bias potential indicated by $+V$ and $-V$. The amplitude of the mains frequency wave appearing at point E is made several times the amplitude required to maintain synchronism once "lock" or near-synchronism has been established, so that, for any permitted variation of mains supply frequency, the bridge will always open when the point E is relatively near earth potential and similarly the potential applied to condenser $C_1$ will also be limited in value. The bias values $+V$ and $-V$ are so chosen that the diodes $V_1$ and $V_2$ are in the non-conducting condition in these circumstances and accordingly the charging current into condenser $C_1$ will be restricted by the resistance $R_4$. This resistance is large so that the condenser $C_1$ is rendered ineffective and the value of resistance $R_1$ is effectively increased beyond its actual physical value as in the case of the known circuit of Fig. 2. Under synchronous conditions, therefore, the circuit will operate with a long time constant. If, however, the near-synchronous condition does not exist and the oscillation source which is to be controlled in frequency by the potential delivered at point F is unlocked, the voltage existing at the point E when the bridge opens may be anything up to the peak potential of the reference frequency sine wave. This potential is applied to condenser $C_1$. Since the diodes $V_1$ and $V_2$ are non-conducting only for a limited range of charging potentials, any applied voltages in the region of the peak potential at point E will render them conducting and resistance $R_4$ will no longer limit the charging current. Providing that the time constant of the charging circuit is low, condenser $C_1$ will be fully charged during the pulse and the effective value of resistance $R_1$ will be reduced to its actual physical value. Thus, under synchronous conditions, the circuit operates with a low time constant thus ensuring a rapid "pull in."

An incidental but important advantage of the arrangement of Fig. 3 as compared to known arrangements is that sudden fluctuations in reference frequency, e.g. changes in phase, will not change the effective time constant of the arrangement to the fast mode unless the change of potential at point E is sufficient to cause the diodes $V_1$, $V_2$ to conduct. If, however, the fluctuation is sufficiently large the bias potential on the diodes across resistance $R_4$ will be overcome and the circuit will change over to the fast mode. This constitutes a substantial practical advantage over a known circuit with a manual switch or with a relay switch operated by detection of the beat note produced in the unlocked condition, for with such a known arrangement, synchronism may be temporarily lost in the event of a sudden reference frequency fluctuation such as a change in phase.

Fig. 4 is largely self explanatory and requires little further description. As will be seen the difference between Figs. 3 and 4 is that in the latter figure the bias potentials for the diodes $V_1$ and $V_2$ are obtained without having to use a negative potential supply.

We claim:

1. A control circuit arrangement adapated to produce a control signal for controlling a source of oscillations in dependence upon the degree of lack of synchronism between the oscillations produced by said source and oscillations of reference frequency, said control circuit arrangement comprising a gating circuit, means to apply reference oscillations to said gating circuit, means for opening said gating circuit at the frequency of said source whereby periodic pulse signals are produced having an amplitude dependent upon the instantaneous amplitude of the reference oscillations at the instant of gating, a series circuit including a storage condenser and a resistance in series, two oppositely poled unilaterally conductive devices, a shunting circuit connecting said resistance and said unilaterally conductive devices in parallel, said storage condenser being connected to said gating circuit so as to be charged therefrom, bias means leading from said unilaterally conductive devices adapted to render said devices non-conducting when the applied periodic pulse signals correspond to near-synchronism between the source frequency and the reference frequency, and output means for delivering an output control voltage connected to said storage condenser.

2. A control circuit arrangement as set forth in claim 1 wherein said gating circuit comprises a rectifier bridge having two pair of diagonal terminal connections and means for applying pulses of opposite polarity and of the source frequency to one pair of diagonal terminal connections of said bridge, means connecting the other pair of terminal connections of said bridge in series with said oscillations of reference frequency, the said series circuit which includes said storage condenser and said resistance in series being connected directly across said last mentioned means and a resistance capacity network interposed between said series circuit and said output means.

3. A television synchronizing generator arrangement as set forth in claim 1, in which said gating circuit includes a rectifier bridge which operates at video frequencies for charging said storage condenser and wherein a low pass filter is interposed between said series circuit which includes said storage condenser and a resistance and said output means, said low pass filter including a resistance for restricting the rate at which the output control voltage can follow the voltage fluctuations across said storage condenser.

References Cited in the file of this patent

UNITED STATES PATENTS

| | | |
|---|---|---|
| 2,240,289 | Dillenburger et al. | Apr. 29, 1941 |
| 2,512,637 | Frazier | June 27, 1950 |
| 2,617,037 | Hugenholtz | Nov. 4, 1952 |
| 2,628,279 | Roe | Feb. 10, 1953 |
| 2,676,262 | Hugenholtz | Apr. 20, 1954 |